United States Patent

Huignard et al.

Patent Number: 5,410,421
Date of Patent: Apr. 25, 1995

[54] OPTICAL SEPARATOR OF POLARIZATIONS AND APPLICATION TO A DISPLAY SYSTEM

[75] Inventors: Jean-Pierre Huignard, Paris; Brigitte Loiseaux, Villebon sur Yvette; Cécile Joubert, Paris, all of France

[73] Assignee: Thomson-CSF, Puteaux, France

[21] Appl. No.: 233,557

[22] Filed: Apr. 26, 1994

Related U.S. Application Data

[63] Continuation of Ser. No. 992,010, Dec. 17, 1992, abandoned.

[30] Foreign Application Priority Data

Dec. 17, 1991 [FR] France .................................. 91 15641

[51] Int. Cl.⁶ .......................... G02B 5/30; G02B 5/32; G02F 1/1335
[52] U.S. Cl. ...................................... 359/15; 359/19; 359/49; 359/63; 359/487; 359/495; 359/496
[58] Field of Search ................. 359/15, 483, 485, 487, 359/495, 496, 566, 569, 19, 48, 49, 63, 70

[56] References Cited

U.S. PATENT DOCUMENTS

| | | | |
|---|---|---|---|
| 2,887,566 | 5/1959 | Marks | 359/487 |
| 3,622,220 | 11/1971 | Kogelnik | 359/15 |
| 3,876,285 | 4/1975 | Schwarzmuller | 359/487 |
| 4,540,246 | 9/1985 | Fantone | 359/15 |
| 4,973,132 | 11/1990 | McDonald et al. | 359/15 |
| 4,993,789 | 2/1991 | Biles et al. | 359/15 |
| 5,212,572 | 5/1993 | Krantz et al. | 359/15 |
| 5,223,956 | 6/1993 | Kramer et al. | 359/17 |
| 5,231,277 | 7/1993 | Aritake et al. | 359/17 |
| 5,245,170 | 9/1993 | Aritake et al. | 359/17 |

FOREIGN PATENT DOCUMENTS

| | | |
|---|---|---|
| 0389240 | 9/1990 | European Pat. Off. . |
| 0422661 | 4/1991 | European Pat. Off. . |
| 0431894 | 6/1991 | European Pat. Off. . |
| 0457605 | 11/1991 | European Pat. Off. . |

*Primary Examiner*—Martin Lerner
*Attorney, Agent, or Firm*—Oblon, Spivak, McClelland, Maier & Neustadt

[57] ABSTRACT

Disclosed is a separator of polarizations comprising a Bragg grating gripped between two plates comprising input and output faces in the form of steps. The advantages of the device are that it is light and compact.

10 Claims, 4 Drawing Sheets

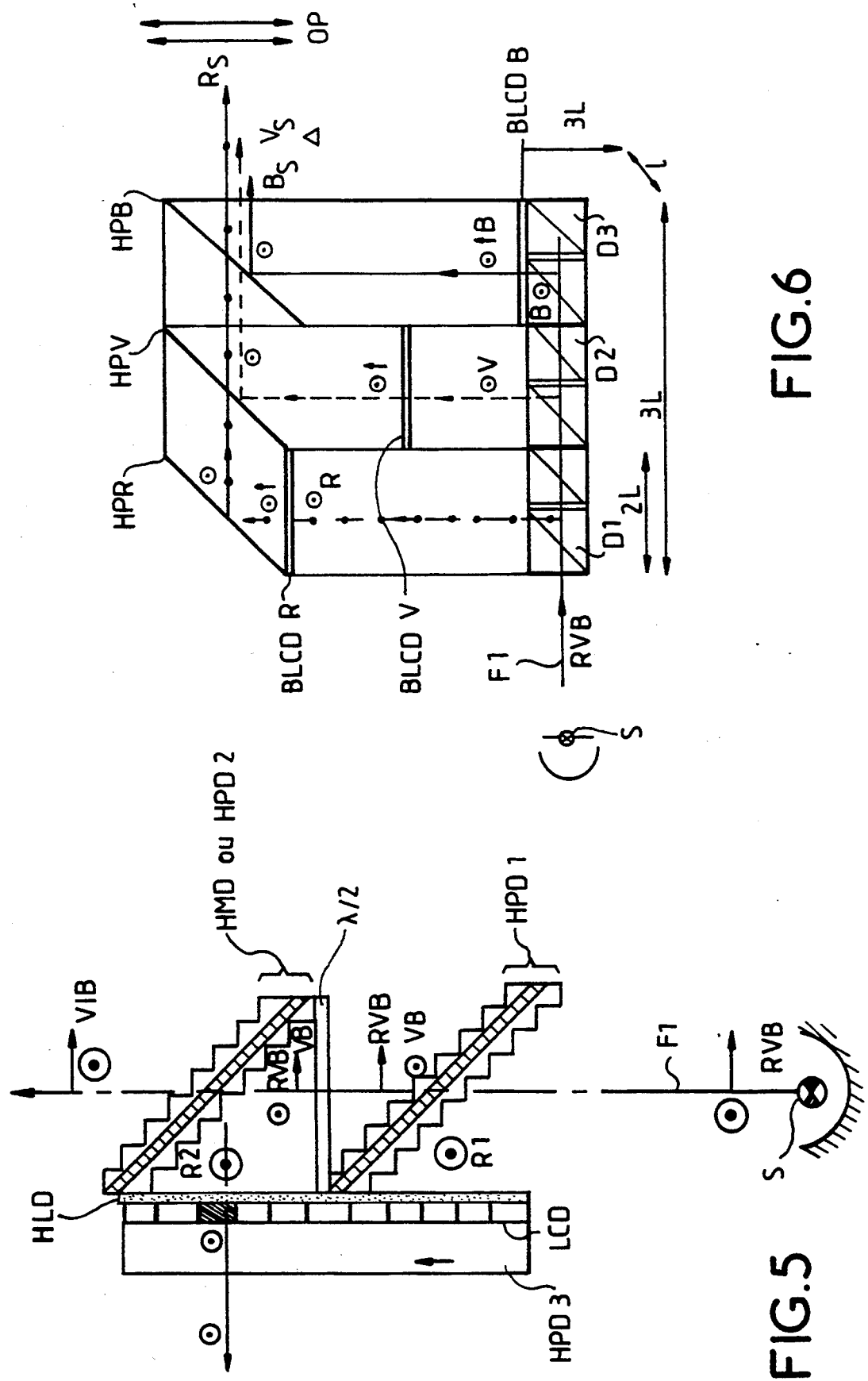

OPTICAL SEPARATOR OF POLARIZATIONS AND APPLICATION TO A DISPLAY SYSTEM

This application is a Continuation of application Ser. No. 07/992,010, filed on Dec. 17, 1992, now abandoned.

BACKGROUND OF THE INVENTION

The invention relates to an optical separator of polarizations and to its application to a display system.

More particularly, the invention relates to an optical component with a small thickness but a large surface area, having the function of polarizing an incident wave coming from a source of coherent light (such as a halogen lamp or arc lamp for example). The component obtained can be integrated especially into an optical configuration of a video projection system, and the invention therefore also relates to a display system, notably a liquid crystal display system.

A Bragg mirror is shown in cross-section in FIG. 1. FIG. 1 shows a Bragg mirror comprising a polarizer for the incident wave, the Bragg angle $\theta_B=45°$ at the wavelength $\lambda$ being also the incidence of the Brewster angle at the interface I between layer with indices of refraction n; n+$\Delta$n. The wave reflected by this component is polarized perpendicularly (as indicated by the conventional polarization symbol, $\odot$, overlying the arrow pointing along the reflected wave propagation direction), while the transmitted wave is located in the plane of incidence. In its standard form, the component is constituted by two 45° prisms that both have an index of refraction with the value of n. These prisms are attached to a holographic component. The holographic component is recorded by ancillary means on a material with photoinduced index variation. This "polarization-separating prism" fulfils a major optical function in a video projector by integrating liquid crystal active matrices. Original optical architectures making use of the properties of polarization and selective diffraction in wavelength, of these components, are the object of the French patent application No. 90 14620. In certain optical configurations, the optical separating cube may have a size equivalent to the LCD screen ($10\times10$ cm² typically) which means making a glass or plastic component that is large-sized, hence heavy and bulky.

The invention enables the making of a separator of polarizations that has a small thickness and is hence lightweight and occupies little space.

SUMMARY OF THE INVENTION

The invention therefore relates to a separator of polarizations, wherein said separator comprises a Bragg mirror gripped between two plates, the two faces of these plates opposite the Bragg mirror having a stepped shape.

The invention also relates to a display system in which the separator is applied, wherein said system comprises at least one controllable electro-optical display device modifying the state of polarization of the output beam according to its state of control, the separator receiving non-polarized light, re-transmitting the light with one polarization to one part of the display device and reflecting the light with another polarization to another part of the display device.

BRIEF DESCRIPTION OF THE DRAWINGS

The various objects and characteristics of the invention will appear more clearly in the following description and in the appended figures, of which:

FIGS. 4 to 7 show an alternative embodiment of the display device according to the invention.

MORE DETAILED DESCRIPTION

Figure 1:
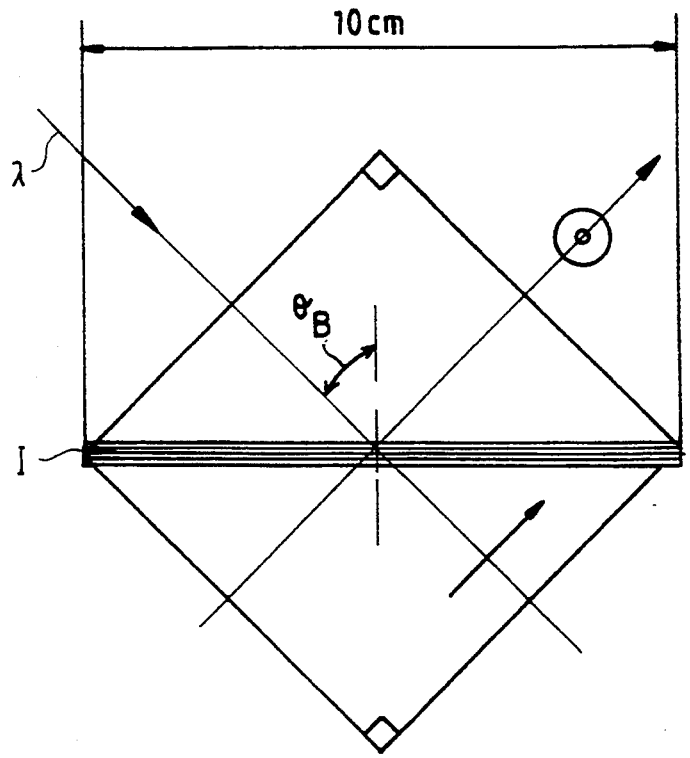
FIG. 1 shows a separator of polarizations known in the prior art and described here above.
Figure 2:
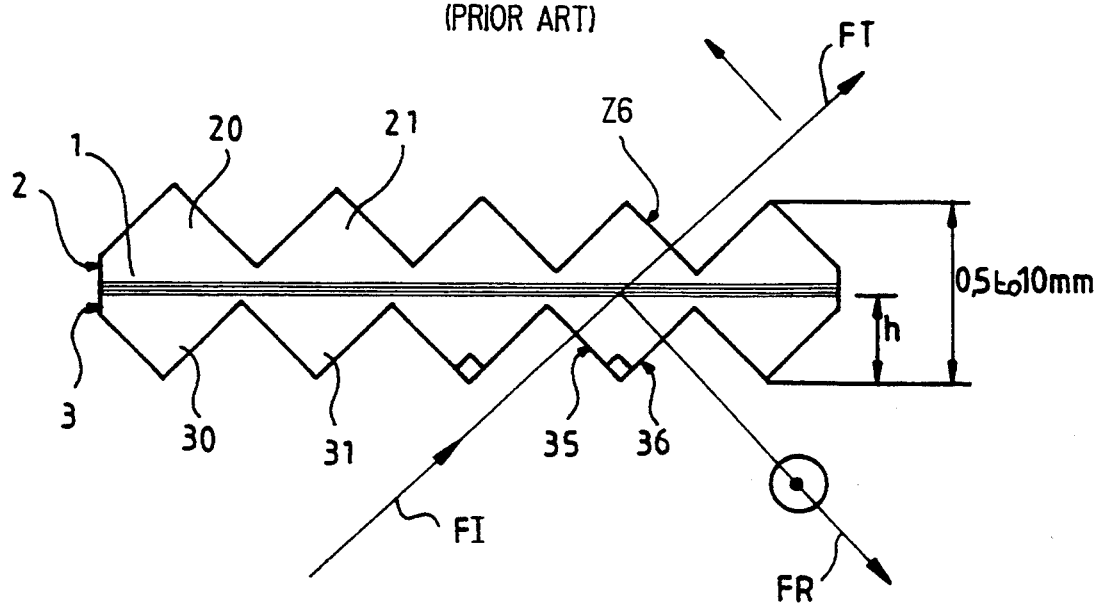
FIG. 2 shows an exemplary embodiment of a separator of polarizations according to the invention.

Referring to FIG. 2, a description shall be given, first of all, of an exemplary embodiment of a separator of polarizations according to the invention.

This separator of polarizations comprises:

Two gratings 2 and 3 of "Fresnel" type microprisms, the angle at the vertex of these microprisms being preferably 90° to obtain maximum efficiency of the component;

a polarization-separating element 1 gripped between the two microprism type gratings 2 and 3. This separator element 1 may be a Bragg mirror recorded on photopolymer material.

The prisms 20, 21, . . . of the grating 2 and the prisms 30, 31, . . . of the grating 3 are made of a material having its index adapted to that of the separator element 1 in such a way that the difference in indices between the prisms and the separator element 1 is small, and may even be zero. For example, the separator element 1 may be made of a polymer material as are also the prisms.

According to a preferred embodiment, the microprism gratings 2 and 3 are made in the form of plates comprising surfaces grooved in the form of prisms.

A non-polarized incident beam FI, the direction of which forms an angle called the Brewster angle with the normal to the plane of the strata of the element 1, has its light polarized in one direction, contained in the plane of incidence, transmitted in a direction FT that is colinear with the direction of incidence. The light polarized in the direction perpendicular to the plane of incidence is reflected in a direction FR perpendicular to the plane of incidence, as indicated by the conventional polarization symbol, $\odot$, overlying the arrow point along the reflected beam propagation direction.

In a preferred embodiment, with the beam FI forming an angle of 45° with the plane of the strata of the element 1, the faces of the prisms such as 35 are perpendicular to the direction of the incident beam. In the same way, the output faces of the reflected beam, such as 36, are perpendicular to the direction FR. The output faces of the transmitted beam, such as 26, are perpendicular to the direction FT.

According to this embodiment, the directions FI, FT, FR are inclined at 45° with respect to the main faces of the element 1. Each prism 20, 21, 30, 31 . . . is then a prism with an angle of 90° at the vertex and with its faces inclined by 45° with respect to the main faces of the element 1. The beam FI is then transmitted and reflected without deformation as the beams FT and FR. However, if the beam has to be subjected to anamorphosis, the grating of strata is not recorded in parallel to the plane of the element 1. Since the beam FI is always inclined by 45° with respect to the plane of the strata and since it is always perpendicular to the face 35, the faces 35 and 36 are no longer at 45° with respect to the plane of the element 1.

Figure 3:
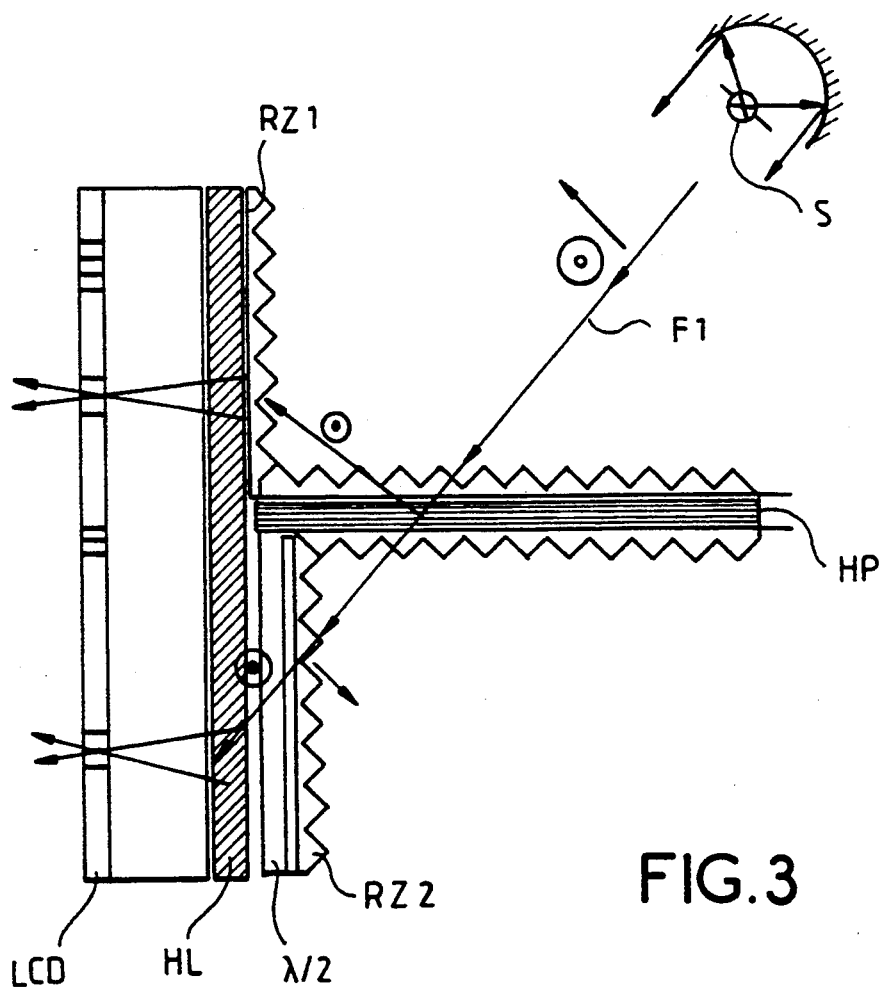
FIG. 3 shows an exemplary embodiment of a display device according to the invention.
Figure 4:
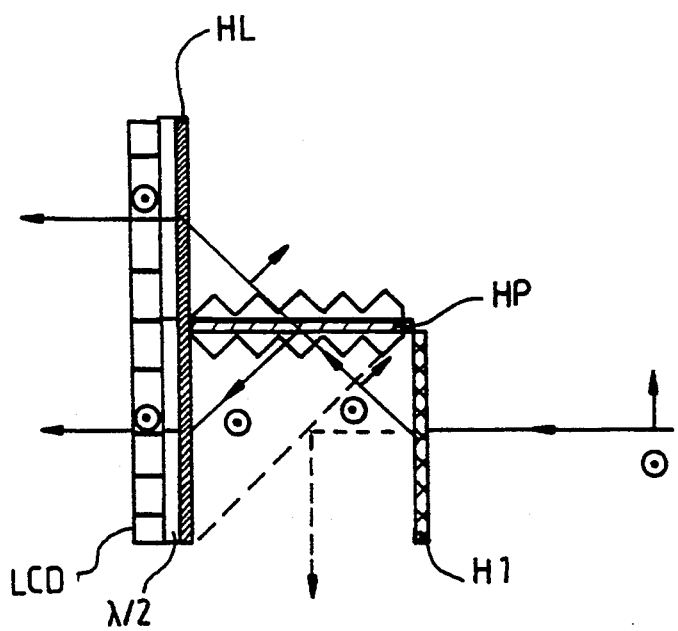

Referring to FIGS. 3 and 4, a description shall now be given of an application of the separator of the invention to a display device.

The device of FIG. 3 is an application to the previous devices in which the light reflected by the polarization-separating device referenced HP illuminates a part (half for example) of a focusing device HL and an LCD screen referenced LCD.

The light which is not reflected (polarization parallel to the plane of incidence) and which is transmitted by the polarization-separating device HP illuminates the other part of the focusing device HL and the other part of the screen. All the light of the source can therefore be used.

The gratings RZ1 and RZ2 attached to the focusing device HL can be used to obtain an incidence normal to the input faces of the gratings RZ1 and RZ2. However, it is also possible not to make provision for gratings RZ1 and RZ2. The focusing device can be used to deflect and focus the light towards the picture elements of the screen LCD.

It is possible to provide for a half-wave plate λ/2 which causes the rotation of the polarization of the light illuminating one of the parts of the screen. In FIG. 3, this half-wave plate is placed in the path of the beam transmitted by the device HP. The screen LCD is then electrically controlled, uniformly throughout its surface. Advantageously, the half-wave plate may be a passive liquid crystal cell working in the (chromatic) waveguide mode. This half-wave plate could be placed in the path of the reflected beam instead of the beam transmitted by the device HP before or after the screen LCD. Again, preferably, this half-wave plate could be placed perpendicularly to the beam.

It is also possible not to make provision for the half-wave plate. In this case, the two parts of the screen are consequently illuminated by light beams having orthogonal polarizations. The two parts of the screen can then be controlled inversely.

Figure 7:
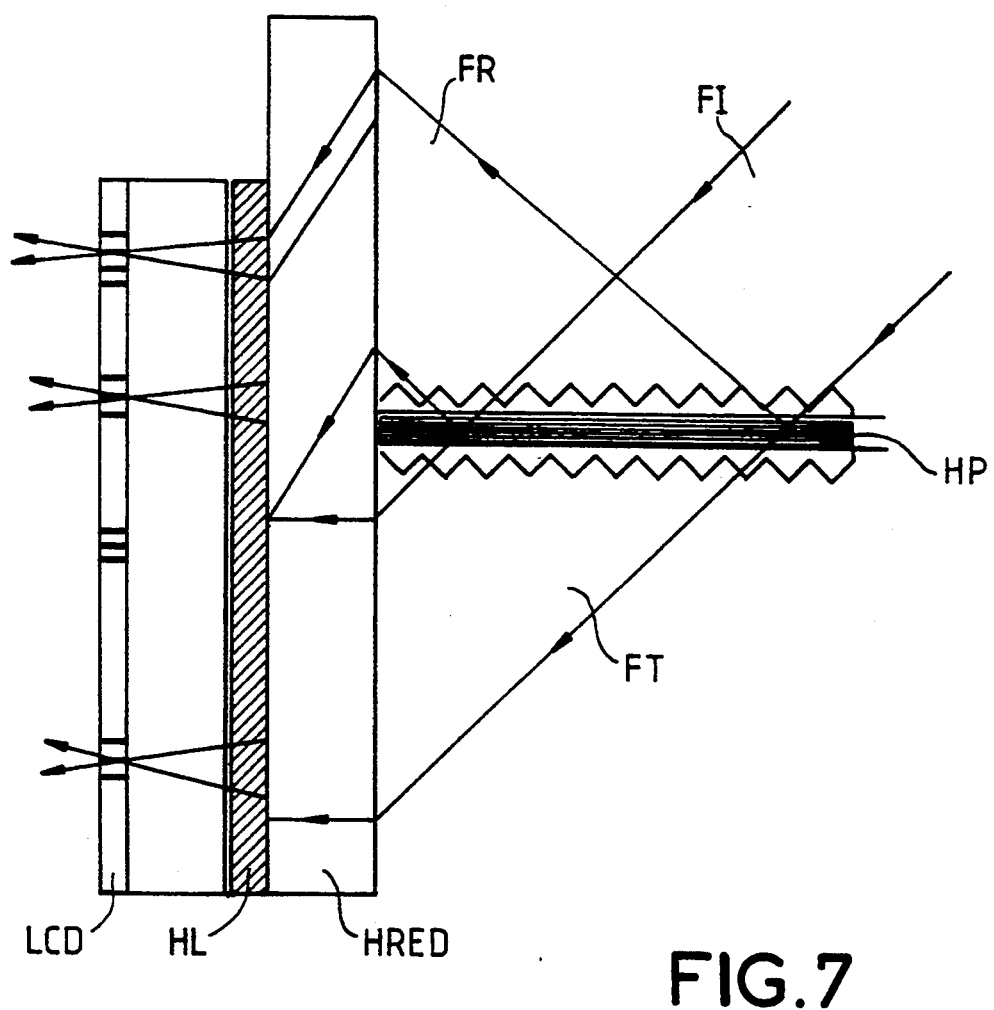

According to one alternative embodiment shown in FIG. 7, there is provision for a device HRED for the deflection of the beams transmitted to the focusing device HL.

Indeed, to avoid having a non-illuminated zone on the screen LCD, in the median part of the screen, the device HRED enables the deflection of either or both of the beams FT and FR so as to bring them closer together. For example, in FIG. 7, the beam FR is deflected to attach it to the beam FT. The beams FT and FR are then transmitted to the focusing device HL which focuses them on the different picture elements of the screen LCD. According to the invention, the device HRED is made in the form of a holographic device.

FIG. 4 shows an alternative embodiment of the system of FIG. 3 that can be used to obtain paths equal at all points from the source S up to the screen LCD. This device comprises, although this is not obligatory, the holographic focusing device HL attached to the screen LCD. The polarization-separating holographic device HP is located in a median plane with respect to the screen LCD and the device HL. The input beam is such that its angle of incidence on the device HP is 45°. To obtain this angle of incidence, a holographic device H1 is recorded to deflect the input beam in such a way as to retransmit it at angle of incidence equal to substantially 45° with respect to the device HP. Preferably, the input beam is perpendicular to the device H1.

In operation at several wavelengths (trichromatic operation), the holographic device H1 deflects the input beam having a wavelength located in a narrow band, the green band for example. The beams having other wavelengths (beams FB (e.g., Blue) and FR (e.g., Red)) are not deflected. However, a dichroic plate LBR reflects these beams FB and FR towards other display devices placed in series (but not shown in the figure).

In the exemplary embodiment of FIG. 4, the dichroic plate LBR could be downline with respect to the device H1, but it could also be upline with respect to the device H1.

FIG. 5 shows an alternative embodiment of the device of the invention. This device has a first polarization-separation device HPD1 positioned so that it is inclined (by 45° for example) with respect to the screen LCD and making it possible to illuminate half of the screen LCD. It receives an incident beam RVB in a direction parallel to the screen LCD. Towards the screen LCD, it reflects one of the polarizations R1 of the incident beam at a determined wavelength (a wavelength corresponding to the red for example). It retransmits, without deflection, the other polarization R2 of the beam of the same wavelength (red) as well as light at all the other wavelengths (notably those corresponding to green and blue).

A second polarization-separating device HPD2, working at the same wavelength as HPD1 (red in the example taken) reflects the beam R2 towards the screen LCD. This separation device can also be a holographic mirror working at the wavelength to be reflected (red).

The screen LCD receives the beams R1 and R2 by means of a focusing device HL which, as described further above, focuses the light on the different picture elements of the screen LCD. However, it is also possible not to make provision for a focusing device HL. At output of the screen LCD, a third polarization-separation device HPD3 lets through the light having a certain polarization and does not retransmit the light with perpendicular polarization, and acts in this way as a function of the image displayed by the screen LCD.

Furthermore, the two parts of the screen receiving the two beams R1 and R2 may be controlled inversely. Or else, it is possible to provide for a half-wave plate λ/2 which makes the polarization of one of these beams rotate by 90°. For example, as is shown in FIG. 5, the plate λ/2 is placed between the first polarization-separation device HPD and the second polarization-separation device HPD2.

The device of FIG. 5 works at only one wavelength or more specifically at a relatively narrow range of wavelengths. The light at other wavelengths is not deflected and emerges as the beam VB.

To process other wavelengths, the invention provides for the positioning of other devices such as the one shown in FIG. 5, according to an arrangement shown in FIG. 6. In this FIG. 6, two other devices have been aligned in the direction of the beam VB. The first device is designed to process a range of wavelengths corresponding for example to the green. It does not deflect the light having a wavelength belonging to a third range, blue for example.

The three devices D1, D2, D3 thus process three different ranges of wavelengths, namely ranges corresponding respectively to the red, the green and the blue.

The three devices coming from the three devices D1, D2, D3 are superimposed by means of three mirrors HPR, HPV, HPB receiving the three processed beams in parallel. These three mirrors are arranged in series in the direction of the reflected beams so as to make the three reflected beams $R_s$, $V_s$, $B_s$ colinear. These three beams are transmitted to an output optical device OP.

The invention has the following three advantages:
the use of a grating of microprisms with a small thickness made by plastic molding, the thickness being, for example, equal to 5 to 10 mm at least;
a Bragg mirror recorded optically on a photopolymer film made to adhere to the gratings formed by microprisms;
a lightweight structure compatible with the fulfilment of the functions of a "polarization-separating cube" that has very large dimensions of 15×15 cm for example.

What is claimed is:

1. An optical display system, comprising:
a polarizing beam splitter for splitting an unpolarized beam into a first polarized beam propagating along a first direction and a second polarized beam propagating along a second direction, wherein the first direction is not the same direction as the second direction, wherein the polarization directions of the first and second beams are orthogonal to one another,
a flat holographic device disposed between the polarized beam splitter and a liquid crystal screen for substantially aligning the directions of propagation of the first and second beams along directions parallel to a predetermined direction, thereby to provide parallel polarized beams, and for deflecting at least one of said first and second polarized beams to bring said parallel polarized beams closer together; and
said liquid crystal screen having picture elements, said picture elements being in a plane which is perpendicular to the predetermined direction, wherein said liquid crystal screen is disposed in the path of the aligned polarized beams.

2. A system according to claim 1, wherein said polarizing beam splitter comprises first and second opposing plates each having first and second sawtooth surfaces and sandwiching a Bragg mirror therebetween, and wherein at least some of the second sawtooth surfaces are not perpendicular to the first sawtooth surfaces.

3. A system according to claim 1, wherein:
said polarizing beam splitter comprises first and second opposing plates each respective first and second sawtooth surfaces and sandwiching a Bragg mirror therebetween; and
the first sawtooth surfaces of the first plate are perpendicular to the second sawtooth surfaces of the first plate, the first sawtooth surfaces of the second plate are perpendicular to the second sawtooth surfaces of the second plate, and the first and second directions are perpendicular to one another.

4. A system according to claim 1, wherein:
said polarizing beam splitter comprises first and second opposing plates each having first and second sawtooth surfaces and sandwiching a Bragg mirror therebetween; and
the Bragg mirror of the polarizing beam splitter is in a plane perpendicular to the plane of the liquid crystal screen.

5. An optical display system, comprising:
a polarizing beam splitter for splitting an unpolarized beam into a first polarized beam propagating along a first direction and a second polarized beam propagating along a second direction, wherein the first direction is not the same direction as the second direction, wherein the polarization directions of the first and second beams are orthogonal to one another,
means for substantially aligning the directions of propagation of the first and second beams along directions parallel to a predetermined direction to thereby provide parallel polarized beams;
a liquid crystal screen having picture elements, said picture elements being in a plane which is perpendicular to the predetermined direction, wherein said liquid crystal screen is disposed in the path of the aligned polarized beams; and
said means for substantially aligning comprising a flat holographic device disposed between the polarized beam splitter and the liquid crystal screen;
wherein the flat holographic device further functions to focus light from said aligned polarized beams onto said picture elements.

6. A system according to claim 5, wherein said polarizing beam splitter comprises first and second opposing plates each having first and second sawtooth surfaces sandwiching a Bragg mirror therebetween, and wherein at least some of the second sawtooth surfaces are not perpendicular to the first sawtooth surfaces.

7. A system according to claim 5, wherein:
said polarizing beam splitter comprises first and second opposing plates each having respective first and second sawtooth surfaces and sandwiching a Bragg mirror therebetween; and
the first sawtooth surfaces of the first plate are perpendicular to the second sawtooth surfaces of the first plate, the first sawtooth surfaces of the second plate are perpendicular to the second sawtooth surfaces of the second plate, and the first and second directions are perpendicular to one another.

8. An optical display system, comprising:
a polarizing beam splitter for splitting an unpolarized beam into a first polarized beam propagating along a first direction and a second polarized beam propagating along a second direction, wherein the first direction is not the same direction as the second direction, wherein the polarization directions of the first and second beams are orthogonal to one another,
means for substantially aligning the directions of propagation of the first and second beams along directions parallel to a predetermined direction to thereby provide parallel polarized beams;
a liquid crystal screen having a picture elements, said picture elements being in a plane which is perpendicular to the predetermined direction, wherein said liquid crystal screen is disposed in the path of the aligned polarized beams; and
said means for substantially aligning comprising a flat holographic device disposed between the polarized beam splitter and the liquid crystal screen;
wherein the polarizing beam splitter comprises a first and second opposing plates sandwiching a first Bragg mirror therebetween, with the first Bragg mirror in a plane that is at a 45 degree angle relative to the plane of the liquid screen, and further comprising a second polarizing beam splitter, said second polarizing beam splitter comprising third and fourth opposing plates sandwiching a second Bragg mirror therebetween, wherein said second polarizing beam splitter is parallel to the first polarizing beam splitter, wherein light that is reflected by the first polarizing beam splitter towards the liquid crystal screen is polarized along a direction which is perpendicular to light reflected towards the liquid crystal screen by the second polarizing beam splitter.

9. A system according to claim 8 wherein the Bragg mirrors of both the first and second polarizing beam splitters function to reflect only one of red light, green light, and blue light.

10. An optical display system, comprising:
a wide and thin liquid crystal screen having picture elements;
polarizing and reflecting first means for reflecting polarized red light along a first direction;
polarizing and reflecting second means for reflecting polarized green light along said first direction;
polarizing and reflecting third means for reflecting polarized blue light along said first direction;
fourth means for reflecting the polarized red light, the polarized green light, and the polarized blue light along a second direction, wherein the polarized red light, the polarized green light, and the polarized blue light reflected by the fourth means is superposed upon a common path;
wherein the liquid crystal screen is disposed in the path of light reflected by at least one of the first, second, and third means; and
wherein each of the first means, the second means, and the third means comprises:
a first polarizing beam splitter for splitting an unpolarized beam into a first colored polarized beam propagating along a first direction, wherein said first colored beam essentially consists of only one of polarized red light, polarized green light, and polarized blue light, and a second beam essentially consisting of all the light that was not reflected by said first polarizing beam splitter, wherein the first direction is not the same direction as the second direction,
wherein said first polarizing beam splitter comprises a first Bragg mirror sandwiched between two opposing plates, each of the two plates that sandwich the first Bragg mirror comprises a first flat surface that is adjacent to the first Bragg mirror and a sawtooth shaped surface that is farther from the first Bragg mirror, each of the sawtoothed surfaces comprising a plurality of sawtooths, each of the plurality of sawtooths comprising a first sawtooth surface and a second sawtooth surface, the first sawtooth surface of each of the plurality of sawtooths is at a 45 degree angle relative to the first flat surface, and
a second polarizing beam splitter, which reflects from the second beam, polarized light having a polarization direction which is orthogonal to the polarization direction of the light reflected by the first polarizing beam splitter, and which reflects light of the of the same color as the light reflected by the first polarizing beam splitter along the same direction as the first polarized beam, wherein said second polarizing beam splitter comprises a second Bragg mirror sandwiched between two opposing plates, each of the two opposing plates that sandwich the second Bragg mirror comprise a first flat surface that is adjacent to the second Bragg mirror and a sawtooth shaped surface that is farther from the second Bragg mirror.

* * * * *